United States Patent [19]
Sledge

[11] Patent Number: 5,557,885
[45] Date of Patent: Sep. 24, 1996

[54] HYDROPONIC PLANTER

[76] Inventor: Harry M. Sledge, 5822 S. 67th E. Ave., Tulsa, Okla. 74145

[21] Appl. No.: 378,965

[22] Filed: Jan. 27, 1995

Related U.S. Application Data

[63] Continuation of Ser. No. 34,741, Mar. 19, 1993, Pat. No. 5,385,590.

[51] Int. Cl.⁶ ............................................. A01G 31/00
[52] U.S. Cl. ................................................ 47/66; 47/79
[58] Field of Search ....................... 47/66 C, 62, 79 N, 47/82

[56] References Cited

U.S. PATENT DOCUMENTS

| | | | |
|---|---|---|---|
| 1,023,354 | 4/1912 | Austin | 47/79 N |
| 4,597,221 | 7/1986 | Adair | 47/66 C |
| 5,127,366 | 7/1992 | Kim | 47/62 |

FOREIGN PATENT DOCUMENTS

| | | | |
|---|---|---|---|
| 1076597 | 10/1953 | France | 47/66 C |
| 300871 | 5/1990 | Germany | 47/82 |

*Primary Examiner*—Henry E. Raduazo
*Attorney, Agent, or Firm*—Frank J. Catalano; Scott R. Zingerman

[57] ABSTRACT

An inexpensive, self-contained, hydroponic planter for various house plants automatically supplies to the plants the correct amount of water, nutrients and adequate root exposure to gases in the air. The planter includes a tank storing the mixture of water and nutrients, a drain for changing the solution and a sight glass for gauging the proper water level range. An air pump with an air line leading from above the water level to the bottom of the storage tank is attached to the intake of a riser tube. The riser tube goes from the bottom of the storage tank through a stand pipe in a pot above the storage tank to the top of the pot. Compressed air intermittently fed into the bottom of the riser tube rises inside the tube, expanding and increasing in velocity as ambient pressure decreases and creating an "air lift" that draws the water into the bottom of the tube and lifts it, along with the expanding air, to the top of the tube where it is discharged into the pot. The water and nutrient solution trickles down through an inert growing medium such as sand, gravel, perlite, vermiculite, or the like and drains from the bottom of the pot back into the storage tank. The inert growing medium absorbs some of the water and nutrient solution, thereby keeping adequate moisture and food for the plant roots while leaving adequate air space so the plant roots can breathe.

2 Claims, 2 Drawing Sheets

5,557,885

HYDROPONIC PLANTER

This is a continuation of application Ser. No. 08/034,741 filed on Mar. 19, 1993, now U.S. Pat. No. 5,385,590.

BACKGROUND OF THE INVENTION

This invention relates generally to hydroponics and more particularly concerns hydroponic planters for maintaining indoor plants.

Living plants contribute to an attractive, healthy indoor environment, but many people forego the benefits of live plants at home or in the work place because they have been frustrated in their attempts to successfully maintain them. Such failures are often the result when the gardener is away from home, "too busy", handicapped by age or disability or simply lacks a "green thumb".

Traditional potted plants are sensitive to the kind of soil they are in, the type and amount of nutrients they receive and the quantity, frequency and regularity with which they are watered. An imbalance in these conditions frequently causes disease in, stunts the growth of, deforms and eventually kills potted plants.

Hydroponic systems have been used successfully for years by commercial growers to eliminate the need for soil and to control and deliver specific doses of moisture and nutrients so that plants always have what they need in the correct proportions. Hydroponically grown plants, including everything from roses to beans, are normally, therefore, excellent specimens.

Hydroponic systems come in many different configurations, ranging from very simple manual systems to very complex automatic systems. Manual systems are generally impractical for use by the average home or office gardener because they require the gardener's frequent and regular attention. For example, in the simplest systems, water containing the necessary nutrients is poured from a bucket into the system and then recaptured in the same bucket after passing through the system. Thus, operation of the system requires the presence of the gardener in a carefully scheduled routine of manual nutrient applications. Known automatic systems, on the other hand, generally depend on expensive electric submersible pumps and require hydraulically discrete pumping systems. They are therefore beyond economic practicality for the average home or office gardener.

It is, therefore, an object of this invention to provide a hydroponic planter which will afford the average, home or office gardener the opportunity to grow plants with little or no attention, expertise or effort. It is another object of this invention to provide a hydroponic planter which automatically dispenses the nutrients the plants need in precisely controlled amounts. A like object of this invention is to provide a hydroponic planter which requires no special knowledge of horticulture or hydroponics to grow a wide variety of healthy plants. A further object of this invention is to provide a hydroponic planter that is complete, self-contained and operates automatically for long periods of time with little or no attention. Similarly, it is an object of this invention to provide a hydroponic planter which requires maintenance at extended periodic intervals. And it is also an object of this invention to provide a hydroponic planter that is attractive and affordable.

SUMMARY OF THE INVENTION

In accordance with the invention, a planter for various house plants is provided incorporating an inexpensive, self-contained, hydroponic system which automatically supplies to the plants the correct amount of water, nutrients and adequate root exposure to gases in the air. The planter includes a tank storing the mixture of water and nutrients, a drain for changing the solution and a sight glass for gauging the proper water level range. An air pump with an air line leading from above the water level to the bottom of the storage tank is attached to the intake of a riser tube. The riser tube goes from the bottom of the storage tank through a stand pipe in a pot above the storage tank to the top of the pot. Compressed air intermittently fed into the bottom of the riser tube rises inside the tube, expanding and increasing in velocity as ambient pressure decreases and creating an "air lift" that draws the water into the bottom of the tube and lifts it, along with the expanding air, to the top of the tube where it is discharged into the pot. The water and nutrient solution trickles down through an inert growing medium such as sand, gravel, perlite, vermiculite, or the like and drains from the bottom of the pot back into the storage tank. The inert growing medium absorbs some of the water and nutrient solution, thereby keeping adequate moisture and food for the plant roots while leaving adequate air space so the plant roots can breathe.

BRIEF DESCRIPTION OF THE DRAWINGS

Other objects and advantages of the invention will become apparent upon reading the following detailed description and upon reference to the drawings in which.

Figure 1:
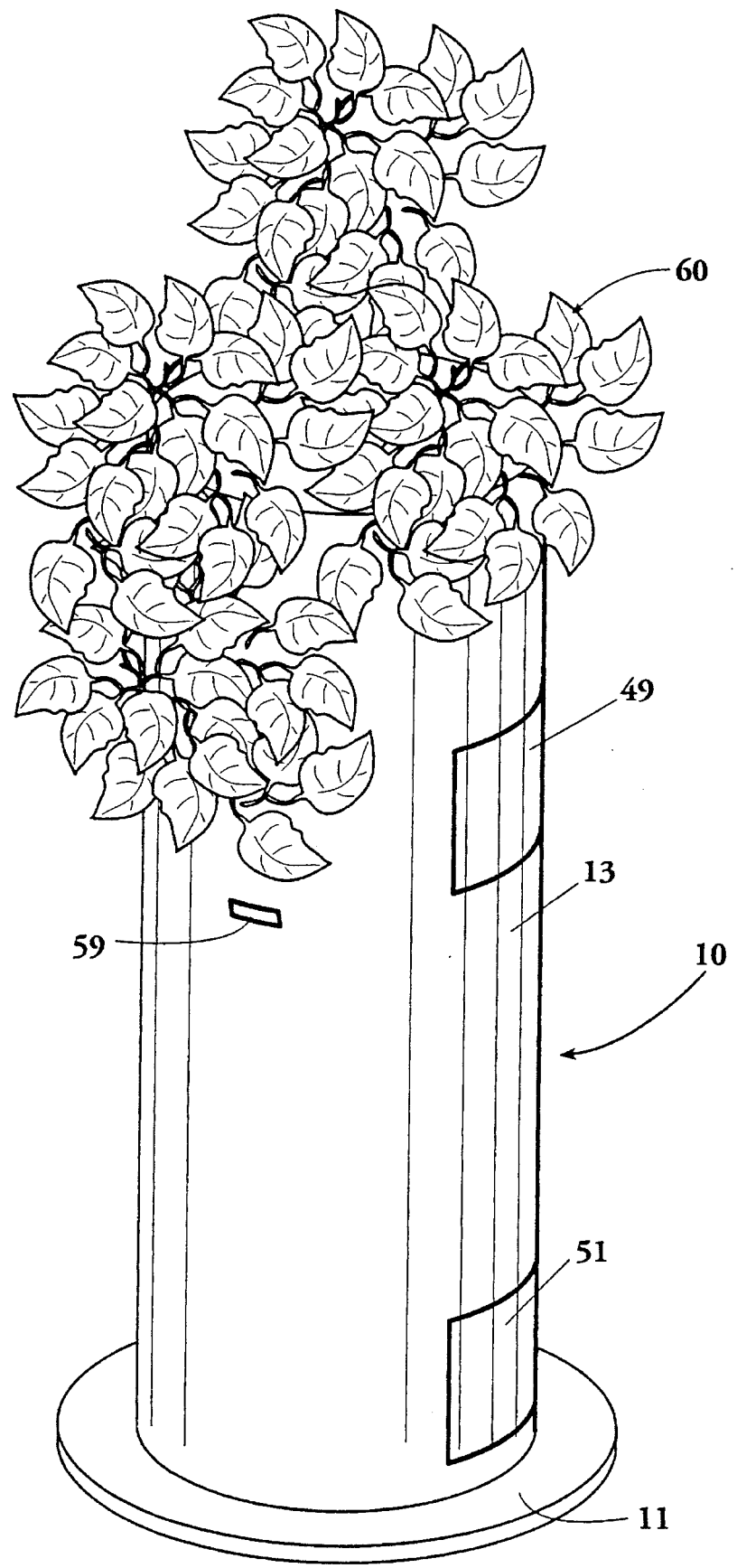
FIG. 1 is a perspective view of a preferred embodiment of the hydroponic planter.
Figure 2:
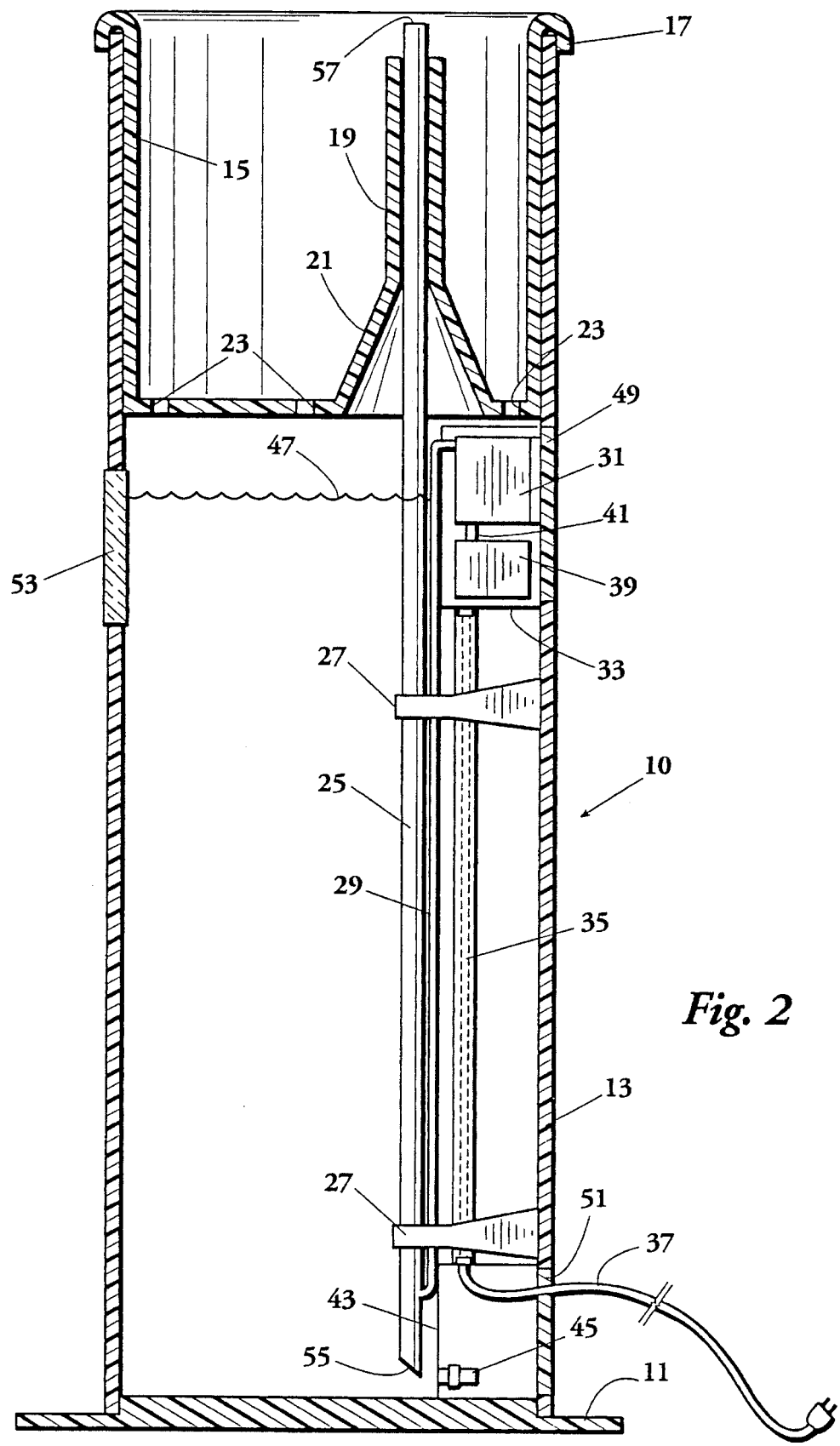
FIG. 2 is a cross-sectional view of the hydroponic planter of FIG. 1 with the plants and growing medium removed.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Turning to the Figures, a preferred embodiment of a hydroponic planter 10 for home or office use consists of a base 11 supporting a tank 13. Preferably, the tank 13 will be a cylindrical of polyvinyl chloride, perhaps thirty inches high with a ten inch diameter. A plant pot 15, is preferably also of polyvinyl chloride and concentric with the tank 13, suspended within the tank 13 by means of a flange 17 along its upper rim which is seated on the top edge of the tank 13. The plant pot 15 has an eccentrically disposed stand pipe 19 extending upwardly from an inverted funnel portion 21 in the bottom of the pot 15. The bottom of the pot 15 is also provided with a plurality of water return holes 23. A riser pipe 25 extends upwardly within the tank 13 from a point proximate the base 11 through and slightly above the upper end of the riser pipe 19. Bracket supports 27 fixed to and extending inwardly from the inside wall of the tank 13 hold the riser pipe 35 in its vertical position. An O-ring (not shown) may be added between the interior wall of the standpipe 19 and the outer wall of the riser pipe 25 to firmly secure the pipe 25 within the pot 15. An air line extends from approximately the bottom of the riser pipe 25 to an air pump 31 mounted in a dry pump compartment or cubicle 33, preferably molded into the tank wall just below the bottom of the plant pot 15. The air line 29 is secured in its vertical condition by the same brackets 27 supporting the inner pipe 25. A dry tube 35 extends downwardly from the bottom of the pump compartment 33 and is also supported by the bracket supports 27. The tube 35 to protects an electrical cord 37 which extends inside the tank 13 to supply power to the air pump 31. A timer 39 is also mounted in the compartment 33 and is electrically connected to the air pump 31 via electrical conductors 41. The timer 39 controls the sequence of operation of the air pump 31. The bottom end of dry tube 35 extends into another compartment or cubicle 43 molded into the bottom of the tank 13. A drain valve 45 extends through the bottom lower end of the tank 13 into the drain compartment 43, which also contains section of outlet hose (not shown) connectable to the valve 45 and stored for the purpose of draining the tank and the free end of the electrical cord 37 which will extend from the drain compartment 43 to an external power source (not shown). At its maximum capacity, the tank 13 will preferably be filled with water to an upper level 47 just below the bottom of the plant pot 15.

The pump compartment 33 and drain compartment 45 are accessible through hinged doors 49 and 51, respectively, in the outer wall of the tank 13. A sight glass 53 overlapping the preferred upper maximum water level 47 enables the user to determine that the tank 13 is filled to the desired capacity during refill.

In the operation of the hydroponic planter 10, with the valve 45 in a closed condition, the tank 13 is filled with water containing the desired nutrients to a selected level as viewed through the sight glass 53. The plant pot 15 containing the plants 60 and the growing medium (not shown) such as sand, gravel, perlite, vermiculite, or the like, is inserted into the tank 13 with the funnel 21 of the plant or pot 15 guiding the riser pipe 25 into the stand pipe 19 until the flange 17 on the planter pot 15 is seated on the upper edge of the tank 13. The electrical cord 37 extending through the door 51 of the drain compartment 43 may then be connected to the power source (not shown). The timer 39 is then set to turn on the pump 31 at desired intervals and for desired durations. When the pump 31 is energized, air is forced through the air line 29 into the lower end of the riser pipe 25 where the air bubbles are permitted to rise toward the surface. As the air rises inside the pipe 25, it expands and increases in its upward velocity as the ambient pressure decreases. This results in suction or air lift at the open ended bottom 55 of the riser tube 25, drawing water containing the necessary nutrients with the expanding air to the top 57 of the riser pipe 25 where it overflows the riser pipe 25 and is discharged to the plant 60 and the growing medium (not shown) in the pot 15. The growing medium retains sufficient water and nutrients to meet the needs of the plants 60 and the excess water and nutrients are discharged through the water return holes 23 in the bottom of the pot 15 to the interior of the tank 13.

The tank 13 of proportions shown in the preferred embodiment illustrated contains sufficient water to permit operation of the hydroponic planter for four to six weeks or more without any further attention or maintenance on the part of the user. When it is desirable to do so, any water or nutrients remaining in the tank 13 can be drained by connecting the outlet hose (not shown) stored in the drain compartment 43 to the drain valve 45 and opening the valve 45.

In the preferred embodiment, the planter 10 is also provided with a pair of diametrically opposed indentations or hand grips 59 which can be used to relocate the planter 10 in an intact condition.

The interior tubes and brackets will preferably but not necessarily be made of polyvinyl chloride. The air pump 31 and the timer 39, which are not exposed to the water within the tank 13, may be relatively inexpensive devices available on the marketplace such as the Model 1 Challenger Special Acquarium Air pump made by Willinger Brothers, Inc., Wrightway, Oakland, N.J. 07436 and the Intermatic Time-All, Model S8811 timer made by Intermatic, Inc., Spring Grove, Ill. electrically connected in standard fashion. Expensive submersible pumps are not required. Furthermore, since the system need not be hydraulically discrete, the system itself is dependable and inexpensive.

Thus, it is apparent that there has been provided, in accordance with the invention, a hydroponic planter that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A hydroponic planter comprising:

a tank for storing a solution of plant nutrients up to a selected level therein;

a pot for containing a growing medium and plants rooted therein, said pot having at least one hole through a bottom thereof aligned for draining into said tank;

means for supporting said pot with said drain hole above said selected level;

a riser pipe mounted within said tank defining a path directing flow of said solution from said tank;

means for causing said solution to flow through said riser pipe;

a stand pipe extending upwardly from said pot bottom and aligned with said riser pipe for extending said flow path through said pot bottom for discharge of said solution into said pot; and said riser pipe extending through said stand pipe, said stand pipe having a lower portion tapered to a greater bottom diameter for facilitating insertion of said riser pipe therein.

2. A hydroponic planter comprising:

a tank for storing a solution of plant nutrients up to a selected level therein;

a pot for containing a growing medium and plants rooted therein, said pot having a least one hole through a bottom thereof for draining said solution into said tank;

a riser pipe mounted within said tank defining a path directing flow of said solution from said tank;

means for causing said solution to flow through said riser pipe; and a stand pipe extending upwardly from said pot bottom and aligned with said riser pipe for extending said flow path through said pot bottom for discharge of said solution into said pot, said stand pipe having a lower portion tapered to a greater bottom diameter for facilitating insertion of said riser pipe therein.

* * * * *